(12) United States Patent
Kwangwaropas et al.

(10) Patent No.: US 6,277,424 B1
(45) Date of Patent: Aug. 21, 2001

(54) PEPPER SEED POLISHING MACHINE

(76) Inventors: Mongkol Kwangwaropas; Anek Sukcharoen, both of Kasetsart University Research and Development Institute, Kasetsart University, Paholyothin Rd., Chatuchak, Bangkok 10900 (TH)

( * ) Notice: Subject to any disclaimer, the term of this patent is extended or adjusted under 35 U.S.C. 154(b) by 0 days.

(21) Appl. No.: 09/553,087

(22) Filed: Apr. 19, 2000

(30) Foreign Application Priority Data

Jul. 22, 1999 (TH) ........................................ 051830

(51) Int. Cl.[7] .............................. A23N 15/06; B02B 3/08; B24B 31/02
(52) U.S. Cl. .............................. 426/483; 99/584; 99/605; 99/609; 99/617; 99/622; 99/630; 99/634; 451/328
(58) Field of Search .............................. 99/584, 605, 608, 99/617, 622, 629, 630, 634, 609; 426/483; 451/326, 328

(56) References Cited

U.S. PATENT DOCUMENTS

| | | | |
|---|---|---|---|
| 1,039 | * 12/1838 | Johnson . | |
| 109,680 | * 11/1870 | Slocumb . | |
| 115,431 | * 5/1871 | Burns . | |
| 288,669 | * 11/1883 | Schwarzwaelder . | |
| 297,353 | * 4/1884 | Dawson . | |
| 343,402 | * 6/1886 | Slater . | |
| 2,293,668 | * 8/1942 | Shankel | 83/30 |
| 3,152,425 | * 10/1964 | Katz et al. | 51/164 |
| 4,051,773 | * 10/1977 | staton | 99/622 |
| 4,066,087 | * 1/1978 | Rodgers | 130/30 H |
| 4,573,244 | 3/1986 | Holcomb et al. | 241/169 |
| 4,697,749 | 10/1987 | Holcomb et al. | 241/169 |

* cited by examiner

Primary Examiner—Keith Hendricks
Assistant Examiner—Drew Becker
(74) Attorney, Agent, or Firm—S. Jesadanont

(57) ABSTRACT

A pepper seed polishing machine consists of a frame made from welded angle iron bars, a polishing mechanism which is a concave made from iron sieve having holes with diameter of 1.5–2 millimeters, and an agitator set. The agitator set consists of three backward curve vane blades welded onto a rotating shaft and is driven by a two-horsepower electric motor via a two V belt-pulley set. Black pepper seed is loaded into a hopper located on top of the machine. After polishing process, the polished seed is unloaded from the machine, while dust and rubbish can be collected separately. Polishing or rubbing off the outer skin of pepper seed resulted from rubbing action between seed to metal and seed to seed. The revolution of the rotor can be changed by changing pulleys' diameter. This results in changing of time required for each cycle of polishing process and polishing capacity as well. After polishing, the pepper seed has much more favorably odor than those polished by the conventional method. Furthermore, the pepper seed is more whitened, and after grinding, the powder from the whitened pepper seed has more favorable color.

2 Claims, 2 Drawing Sheets

PEPPER SEED POLISHING MACHINE

BACKGROUND OF THE INVENTION

Pepper is grown in eastern part of Thailand and in many countries as well. Almost all people around the world consume pepper. Usually, Thai people prefer consuming whitened pepper. After harvesting, black pepper is put under water for several days until the outer skin is softened and then rubbed off manually. The pepper seed is thereafter dried and coated with some substance in order to give uniformly white seed. This process results in reduction of peppers' odour and consumes too much time and material, thus is undesirable.

The present Peppers seed polishing machine is therefore invented in order to partially rub off the black outer skin of black pepper seed. This results in much more preferable colour and odour of pepper seed. This machine consists of several parts. A two horsepower electric motor is used as a power unit. The power is transmitted via V-belts to an agitator. The agitator agitates black pepper seed against a concave, which is made from iron sieve. Black pepper seed is loaded into a hopper, which is located on top of the machine. As seed enters the polishing mechanism, it is polished by means of rubbing between seed and metal surfaces, and between seed to seed as well. After finishing the process, the polished seed is taken out from the machine. Dust and rubbish can be separately collected.

SUMMARY OF THE INVENTION

A pepper seed polishing machine consists of a seed hopper, a polishing machine which consists of a concave sieve, and an agitator set. After finishing the polishing process, the polished seed is delivered from the bottom of the concave, which has a flapper. Dust and rubbish can be separately collected.

DETAILED DESCRIPTION OF THE INVENTION

Figure 1:
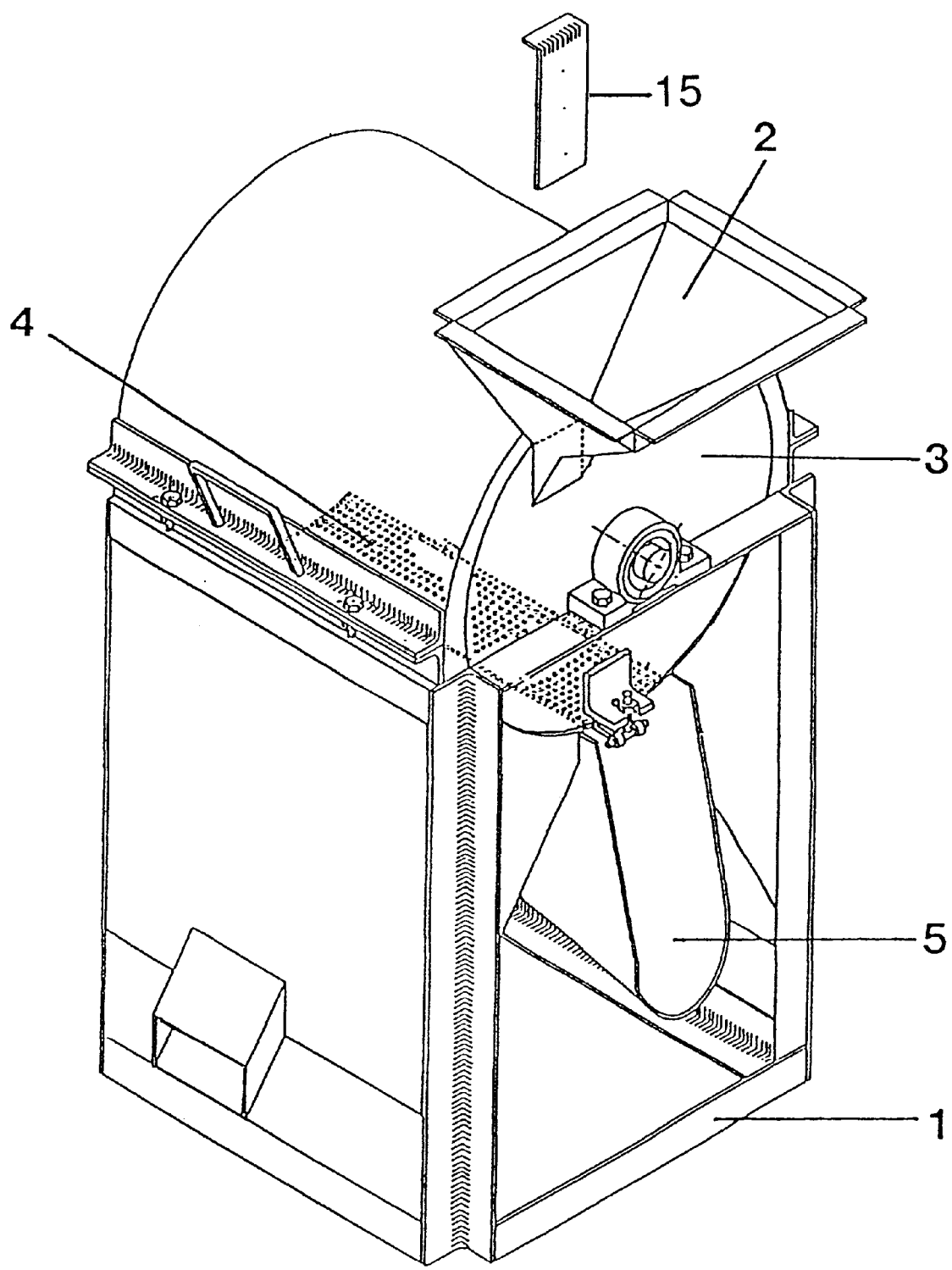
FIG. 1 shows an isometric view of the present pepper seed polishing machine.

Referring to FIG. 1, frame 1 is made from angle iron bars. It is a welded construction. Black pepper seed is loaded through hopper 2, which is )located on top of the machine. There is an adjustable flap to allow seed to flow into polishing drum 3. A flapper 4 is located in the lower middle part of polishing concave in order to facilitate removing of polished seed out from the machine via chute 5. Concave 6 is made from a sieve having holes with diameter of 1.5 to 2 millimeters and thickness of 1 to 1.5 millimeters. An iron plate 15 is used to control the flow rate of pepper seeds into hopper 2.

Figure 2:
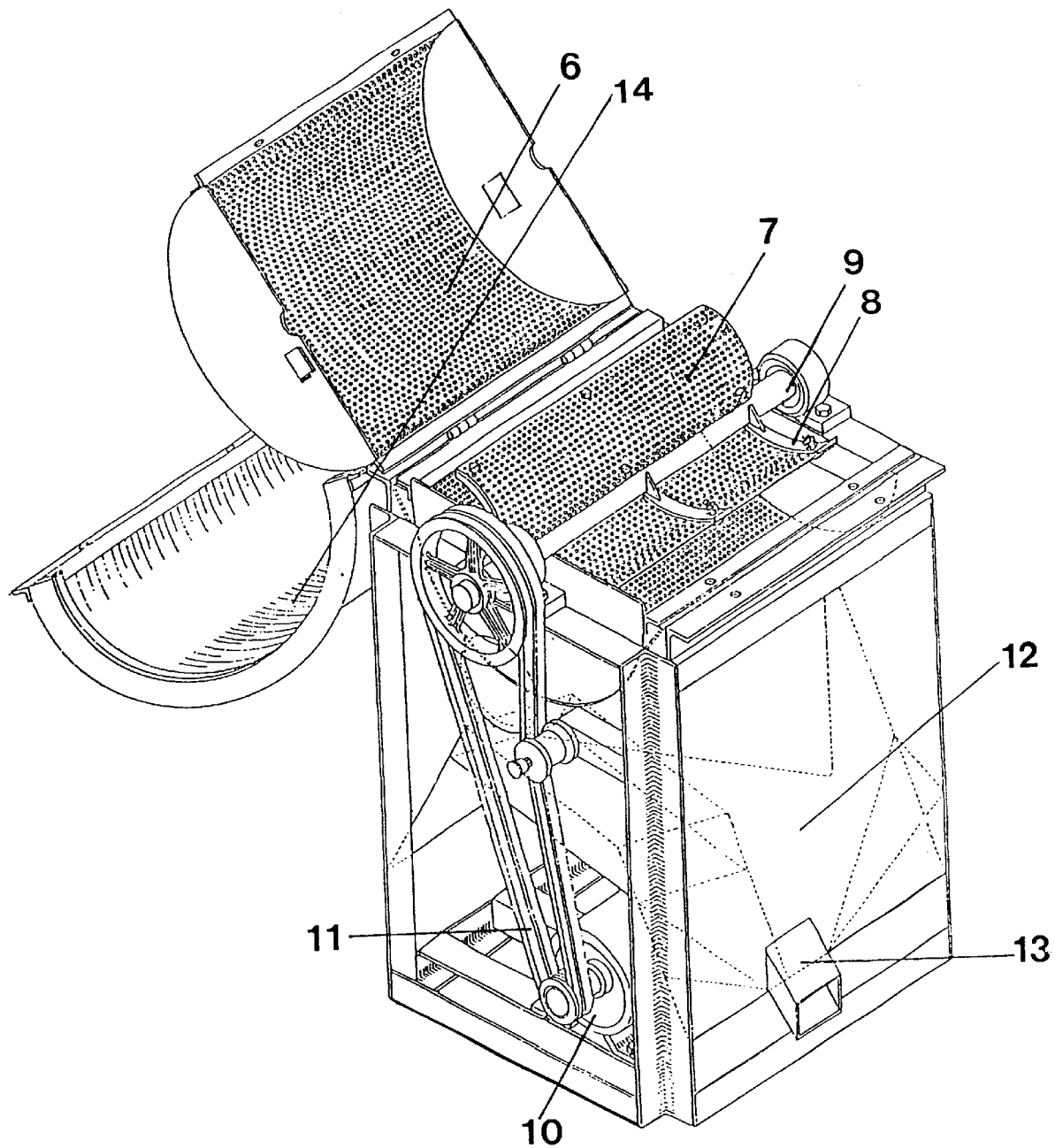
FIG. 2 shows an isometric view of the present pepper seed polishing machine with its cover opened.

Polishing mechanism is shown in FIG. 2. An agitator made from three backward curve vanes 7 is mounted on a vanes' frame 8. This frame is welded to a shaft 9. It is designed to work in conjunction with concave 6. The agitator set is driven by an electric motor 10 via a two V-belt-pulley set 11. An agitator blade or vane is also made from iron sieve. During polishing process, dust and rubbish can be separated by moving along an inclined plane 12. After that, pepper seeds are collected in chute 13 before going into a container. A movable cover 14 made from sheet metal is located on the top of concave 6. The upper part of concave 6 can be opened for cleaning purpose.

After finishing the polishing process, the polished pepper seed is delivered from the machine by opening flapper 4, which is located under, and in the lower middle portion of concave 6. Before opening flapper 4, the power must be switched off and the agitator must be completely stopped. About 8 kilograms of black pepper seed can be loaded per lot. Polishing process takes about 10–12 minutes per load.

It will be understood that modifications can be made in the above description without departing from the scope of this invention by one of ordinary skill in the art. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. A pepper seed polishing machine, comprising:
   a frame made from welded angle iron bar;
   a polishing mechanism which is a metal drum having holes of diameter of 1.5–2 millimeters all along the cylindrical surface of said drum where an upper longitudinal half of said drum can be opened;
   a hopper located on top of the machine which communicates with the interior of said metal drum through an opening;
   a half cylindrical metal cover to cover said drum to keep dust and rubbish resulting from polishing not to disperse;
   a flapper at a lower half of said drum to collect polished seed into a chute located underneath said flapper; and
   an agitator set having three backward curve vane blades welded onto a rotating shaft driven to rotate by a two-horsepower electric motor through a two V belt-pulley set whereof the time required for each cycle of polishing process and polishing capacity can be varied by varying pulleys' diameter and whereupon said three blades also have holes of diameter of 1.5–2 millimeters all along the surface of said three blades.

2. A method of polishing pepper seed comprises steps of loading black pepper seed into said hopper located on top of said pepper polishing machine of claim 1, rubbing off pepper seed skin in said polishing mechanism by agitation through rubbing action between seed and metal of said three backward curve vane blades in said agitator set and between seed and seed and unloading the polished seed from the machine, whereof dust and rubbish resulted from polishing are separated and collected.

* * * * *